United States Patent
Higashi et al.

(10) Patent No.: US 9,017,880 B2
(45) Date of Patent: Apr. 28, 2015

(54) INORGANIC MAGNESIUM SOLID ELECTROLYTE, MAGNESIUM BATTERY, AND METHOD FOR PRODUCING INORGANIC MAGNESIUM SOLID ELECTROLYTE

(71) Applicant: Kabushiki Kaisha Toyota Chuo Kenkyusho, Nagakute-shi, Aichi-ken (JP)

(72) Inventors: Shougo Higashi, Nagakute (JP); Masakazu Aoki, Nagakute (JP)

(73) Assignee: Kabushiki Kaisha Toyota Chuo Kenkyusho, Nagakute-shi (JP)

( * ) Notice: Subject to any disclaimer, the term of this patent is extended or adjusted under 35 U.S.C. 154(b) by 0 days.

(21) Appl. No.: 13/890,647

(22) Filed: May 9, 2013

(65) Prior Publication Data
US 2013/0316249 A1   Nov. 28, 2013

(30) Foreign Application Priority Data

May 15, 2012   (JP) .................................. 2012-111899

(51) Int. Cl.
| | |
|---|---|
| *H01M 10/0562* | (2010.01) |
| *H01M 10/054* | (2010.01) |
| *C01B 21/092* | (2006.01) |
| *C01B 6/00* | (2006.01) |
| *C01B 6/15* | (2006.01) |

(52) U.S. Cl.
CPC ........ *H01M 10/0562* (2013.01); *H01M 10/054* (2013.01); *H01M 2300/0068* (2013.01); *C01B 21/092* (2013.01); *C01P 2002/72* (2013.01); *C01B 6/003* (2013.01); *C01B 6/15* (2013.01)

(58) Field of Classification Search
CPC ..... C01B 6/15; C01B 6/003; H01M 10/0562; H01M 2300/0068
USPC .......................................... 429/304; 423/286
See application file for complete search history.

(56) References Cited

U.S. PATENT DOCUMENTS

2009/0324997 A1* 12/2009 Tsuji ................................. 429/2
2012/0251871 A1* 10/2012 Suzuki et al. .................. 429/158

FOREIGN PATENT DOCUMENTS

| JP | A-2000-003619 | 1/2000 |
|---|---|---|
| JP | A-2000-082327 | 3/2000 |
| JP | A-2002-352858 | 12/2002 |
| JP | A-2003-042999 | 2/2003 |
| JP | 2004327326 | * 11/2004 |
| JP | A-2007-188694 | 7/2007 |

* cited by examiner

*Primary Examiner* — Ladan Mohaddes
(74) *Attorney, Agent, or Firm* — Oliff PLC

(57) ABSTRACT

A magnesium battery 10 according to the present invention includes a positive electrode 12, a negative electrode 14 having a magnesium-containing negative electrode active material, and an inorganic magnesium solid electrolyte 16 that is interposed between the positive electrode 12 and the negative electrode 14, has a complex ion structure that contains magnesium and hydrogen, and conducts magnesium ions. The inorganic magnesium solid electrolyte 16 may contain a compound having at least one selected from boron and nitrogen. The inorganic magnesium solid electrolyte may be produced by a production method that includes a heat-treatment step of mixing and heating $Mg(BH_4)_2$ and $Mg(NH_2)_2$ to form a compound having a complex ion structure that contains magnesium and hydrogen.

6 Claims, 2 Drawing Sheets

US 9,017,880 B2

INORGANIC MAGNESIUM SOLID ELECTROLYTE, MAGNESIUM BATTERY, AND METHOD FOR PRODUCING INORGANIC MAGNESIUM SOLID ELECTROLYTE

BACKGROUND OF THE INVENTION

1. Field of the Invention

The present invention relates to an inorganic magnesium solid electrolyte, a magnesium battery, and a method for producing an inorganic magnesium solid electrolyte.

2. Description of the Related Art

Heretofore, a magnesium solid electrolyte having a magnesium ion conductivity enhanced by using $MgZr_4(PO_4)_6$, which has been made into a composite by dispersing a second component containing a cation having a higher valence than magnesium ions, has been proposed (for example, refer to Patent Document 1).

[Patent Document 1] JP 2000-82327 A

SUMMARY OF THE INVENTION

Since magnesium ions are divalent and magnesium in a solid electrostatically and strongly bonds to anions constituting the crystal, the ion conductivity thereof is anticipated to be smaller than that of, for example, monovalent ions. In the magnesium solid electrolyte of Patent Document 1 described above, although the magnesium ion conductivity is enhanced by, for example, adding a higher valence cation and thereby suppressing binding to anions, the conductivity is still on the $10^{-3}$ S/cm order at about 800° C., a high operation temperature is required, and the conductivity thereof has not been sufficient. A novel material that conducts magnesium ions has also been sought after.

The present invention has been made to address such a challenge. The main object thereof is to provide a novel inorganic magnesium solid electrolyte that conducts magnesium ions, a magnesium battery, and a method for producing an inorganic magnesium solid electrolyte.

The inventors of the subject application conducted extensive studies to achieve the object described above and found that magnesium ions can be conducted by using a compound that contains magnesium and at least one selected from boron hydride and nitrogen hydride, thereby making the present invention.

In other words, an inorganic magnesium solid electrolyte according to the present invention conducts magnesium ions and contains a compound having a complex ion structure that contains magnesium and hydrogen.

A magnesium battery of the present invention includes a positive electrode, a negative electrode having a magnesium-containing negative electrode active material, and the above-described inorganic magnesium solid electrolyte that conducts magnesium ions.

A method for producing an inorganic magnesium solid electrolyte of the present invention is a method for producing an inorganic magnesium solid electrolyte that conducts magnesium ions, the method including a heat-treatment step of mixing and heating $Mg(BH_4)_2$ and $Mg(NH_2)_2$ to form a compound having a complex ion structure that contains magnesium and hydrogen.

The present invention can provide a novel inorganic magnesium solid electrolyte that conducts magnesium ions, a magnesium battery, and a method for producing an inorganic magnesium solid electrolyte. According to the present invention, for example, it is presumed that ion conduction paths are formed in the complex ion structure containing magnesium and hydrogen due to specific spatial arrangement of complex anions, and since activation barriers are relatively small during migration through these paths, divalent magnesium ions can be conducted at a relatively low temperature.

DESCRIPTION OF THE PREFERRED EMBODIMENTS

Figure 1:
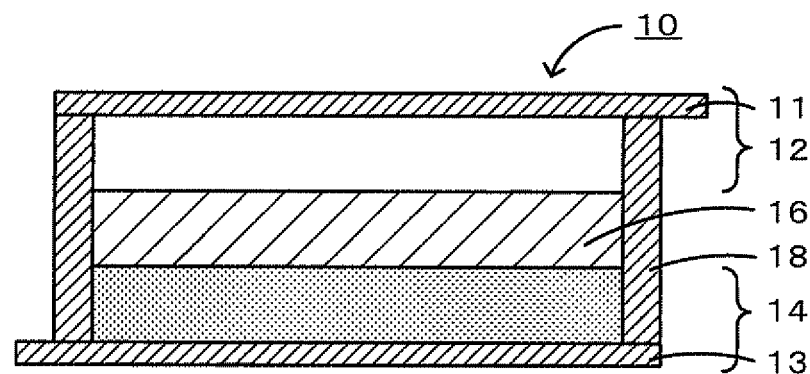
FIG. 1 is a schematic diagram showing one example of a magnesium battery 10 according to the present invention.

An inorganic magnesium solid electrolyte according to the present invention conducts magnesium ions and contains a compound having a complex ion structure that contains magnesium and hydrogen. The compound contained in the inorganic magnesium solid electrolyte (hereinafter this compound may be simply referred to as "compound") preferably contains at least one selected from boron and nitrogen. Moreover, the compound preferably contains at least one selected from boron hydride and nitrogen hydride. In this manner, a magnesium-containing complex structure is easily formed. The compound preferably contains at least one structure selected from $Mg(BH_4)_2$ and $Mg(NH_2)_2$ and more preferably contains a structure $Mg(BH_4)(NH_2)$. When the structures $Mg(BH_4)_2$ and $Mg(NH_2)_2$ are contained, magnesium ions can be conducted at, for example, an operation temperature of 250° C. or less, which is a relatively low temperature. Moreover, a higher electrical conductivity can be exhibited. Furthermore, when the structure $Mg(BH_4)(NH_2)$ is contained, a further higher electrical conductivity is exhibited and magnesium ions can be conducted at a further higher conductivity. Here, "contains a structure $Mg(BH_4)(NH_2)$" means not only that $Mg(BH_4)_2$ and $Mg(NH_2)_2$ are simply mixed but also that the structure $Mg(BH_4)(NH_2)$ is contained. The compound preferably contains 50 mol % or more and more preferably 80 mol % or more of $Mg(BH_4)(NH_2)$.

The compound may be prepared through a heat-treatment step of mixing and heating $Mg(BH_4)_2$ and $Mg(NH_2)_2$. As a result, the structure $Mg(BH_4)(NH_2)$ can be formed. In this heat-treatment step, for example, $Mg(BH_4)_2$ and $Mg(NH_2)_2$ are preferably mixed in a molar ratio of 1:1. The atmosphere in which the treatment is performed is not particularly limited and may be air but is preferably an inert atmosphere such as a rare gas such as Ar or nitrogen gas. The heat-treatment temperature is, for example, preferably higher than the operation temperature at which the inorganic magnesium solid electrolyte is to be used and preferably lower than the thermal decomposition temperature or melting temperature of the raw materials, $Mg(BH_2$ and $Mg(NH_2)_2$. The heat-treatment temperature is preferably 100° C. or higher, more preferably 150° C. or higher, and most preferably 180° C. or higher. The heat-treatment temperature is preferably 200° C. or lower. The heat-treatment time may be appropriately set according to the conditions such as the heat-treatment temperature and may be, for example, in the range of 1 to 12 hours.

The inorganic magnesium solid electrolyte preferably has a porosity of 15 vol % or less, more preferably 10 vol % or less, and most preferably 5 vol % or less. The porosity is preferably low since the magnesium ion conductivity can be further enhanced.

With the inorganic magnesium solid electrolyte, the operation temperature at which magnesium ions are conducted can be adjusted to 200° C. or lower. At an operation temperature of 200° C. or lower, thermal decomposition or melting of the compound having a complex ion structure can be further suppressed. The operation temperature is preferably 80° C. or higher, more preferably 100° C. or higher, and most preferably 150° C. or higher considering the magnesium ion conductivity.

The inorganic magnesium solid electrolyte preferably has an electrical conductivity of $1\times10^{-10}$ Scm$^{-1}$ or more, more preferably $1\times10^{-8}$ Scm$^{-1}$ or more, and most preferably $1\times10^{-7}$ Scm$^{-1}$ or more. The electrical conductivity is preferably high since magnesium ions can be more easily conducted.

Next, a method for producing an inorganic magnesium solid electrolyte according to the present invention is described. This production method includes, for example, a heat-treatment step of forming a compound having a complex ion structure that contains magnesium and hydrogen and may further include a molding step of molding the resulting compound having a complex ion structure.

In the heat-treatment step, a treatment of mixing and heating $Mg(BH_4)_2$ and $Mg(NH_2)_2$ is performed. As a result of this treatment, the structure $Mg(BH_4)(NH_2)$ can be obtained. In this heat-treatment step, for example, $Mg(BH_4)_2$ and $Mg(NH_2)_2$ are preferably mixed in a molar ratio of 1:1. The atmosphere in which the treatment is performed is not particularly limited but is preferably an inert atmosphere such as a rare gas such as Ar or nitrogen gas. The heat-treatment temperature is preferably higher than the operation temperature at which the inorganic magnesium solid electrolyte is to be used and preferably lower than the thermal decomposition temperature or melting temperature of the raw materials, $Mg(BH_4)_2$ and $Mg(NH_2)_2$. The heat-treatment temperature is preferably 50° C. or higher, more preferably 150° C. or higher, and most preferably 180° C. or higher. The heat-treatment temperature is preferably 200° C. or lower. The heat-treatment time may be appropriately set according to conditions such as the heat-treatment temperature and may be, for example, in the range of 1 to 12 hours. This heat-treatment step may be performed on a compact molded by cold-pressing a mixed powder in which $Mg(BH_4)_2$ and $Mg(NH_2)_2$ are mixed. The inorganic magnesium solid electrolyte may be prepared by mixing raw materials in a particular ratio, molding the resulting mixture, and then heating the mixture, or by heat-treating a raw material powder in a mixture form in a particular ratio and then performing molding. Alternatively, the inorganic magnesium solid electrolyte may be prepared by mixing the raw materials in a particular ratio, molding the resulting mixture, heating the mixture, pulverizing the resulting compact, and then molding the pulverized compact into a desired shape.

In the molding step, for example, a treatment of forming a compact by using the above-described compound having a complex ion structure is performed. In this molding treatment, it is preferable from the viewpoint of enhancing the magnesium ion conductivity to form a compact that maintains a complex ion structure while having a lower porosity. The molding treatment is preferably performed under such conditions that the porosity is 15 vol or less and more preferably 10 volt or less. An example of the molding treatment is cold pressing. The molding pressure is preferably in the range of 5 MPa or more and 50 MPa or less and more preferably in the range of 15 MPa or more and 25 MPa or less, for example. The molding shape can be circular, rectangular, or the like, and the thickness and the size may be selected according to the usage. In the molding step, for example, the compound having a complex ion structure may be press-molded together with an electrode, for example, so as to form a composite laminate of the electrode and the inorganic magnesium solid electrolyte. In such a case, the molding treatment may be performed so as to form an electrode on one side of the inorganic magnesium solid electrolyte or to form electrodes on both sides of the inorganic magnesium solid electrolyte. An inorganic magnesium solid electrolyte according to the present invention can be obtained as described above.

A magnesium battery according to the present invention will now be described. A magnesium battery according to the present invention includes a positive electrode, a negative electrode having a magnesium-containing negative electrode active material, and an inorganic magnesium solid electrolyte that is interposed between the positive electrode and the negative electrode and conducts magnesium ions, the electrolyte being any one of the inorganic magnesium solid electrolytes described above. The magnesium battery may be, for example, a magnesium-halogen battery that uses a halogen as a positive electrode active material, a magnesium-air battery that uses oxygen as a positive electrode active material, a magnesium battery that uses magnesium as a charge carrier, or a magnesium ion battery that utilizes the intercalation reaction of magnesium. Here, a magnesium battery that uses magnesium as a charge carrier is mainly described.

The positive electrode of a magnesium battery according to the present invention may be prepared by, for example, mixing a positive electrode active material, a conductive agent, and a binder, adding an appropriate solvent to the resulting mixture to prepare a positive electrode material paste, applying the paste to a surface of a current collector, drying the applied paste, and, if needed, pressing the dried paste so as to increase the electrode density. Positive electrode active materials that are used in common magnesium batteries can be used as the positive electrode active material. More specifically, sulfur, sulfides of transition metals, molybdenum chalcogenide-based compounds, transition metal oxides such as $V_2O_5$, and magnesium complex oxides can be used. The molybdenum chalcogenide-based compound may be, for example, a compound represented by general formula $M_\Omega Mo_6X_8$ (where M represents at least one selected from Li, Sn, Pb, Fe, Cu, and Ag; X represents at least one selected from S, Se, and Te; and n represents an arbitrary integer). Among these, sulfur, a molybdenum chalcogenide-based compound, and the like are preferred. The conductive agent is not particularly limited so far as it is an electron-conductive material that does not adversely affect the battery performance of the positive electrode. For example, one or a mixture of two or more selected from graphite such as natural graphite (scaly graphite and flake graphite) and artificial graphite, acetylene black, carbon black, ketjen black, carbon whiskers, needle coke, carbon fibers, and metals (copper, nickel, aluminum, silver, gold, etc.) can be used. From the viewpoints of electron conductivity and coatability, carbon black and acetylene black among these are preferred as the conductive agent. The binder has a function of holding the active material particles and the conductive agent particles together. For example, polytetrafluoroethylene (PTFE), polyvinylidene fluoride (PVdF), a fluorine-containing resin such as fluororubber, a thermoplastic resin such as polypropylene or polyethylene, ethylene propylene diene monomer (KIM rubber, sulfonated EPDM rubber, natural butyl rubber (NBR), and the like may be used alone or in combination as a mixture of two or more. A water-based binder such as a cellulose-based binder, a water dispersion of styrene butadiene rubber (SBR), and the like may also be used. Organic solvents such as N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran can be used as the solvent for dispersing the positive electrode active material, the conductive agent, and the binder. Alternatively, a dispersant, a thickener, and the like may be added to water and the active material may be made into slurry by using a latex such as SER. For example, polysaccharides such as carboxymethyl cellulose and methyl cellulose can be used alone or in combination as a mixture of two or more as the thickener. Examples of the coating method include roller coating that uses an applicator roll or the like, screen coating, a doctor blade method, spin-coating, and bar coater. Any of these may be used to yield the desired thickness and shape. As the current collector, aluminum, titanium, stainless steel, nickel, iron, baked carbon, a conductive polymer, or a conductive glass may be used; alternatively, aluminum or copper surface-treated with carbon, nickel, titanium, silver, or the like may also be used so as to improve the adhesiveness, conductive property, and oxidation resistance. It is possible to oxidize the surface of these materials. Examples of the form of the current collector include a foil, a film, a sheet, a net, a punched or expanded material, a lath body, a porous body, a foamed body, and a fiber compact. The thickness of the current collector is, for example, 1 to 500 μm.

The negative electrode of the magnesium battery according to the present invention contains magnesium. The negative electrode may be, for example, metallic magnesium or a magnesium alloy. Examples of the magnesium alloy include alloys of magnesium with aluminum, silicon, gallium, zinc, manganese, or the like. A material that can intercalate and deintercalate magnesium ions can be used as the negative electrode active material. In the case such a material is used, the negative electrode of the magnesium battery according to the present invention may be prepared by, for example, mixing a negative electrode active material, a conductive agent, and a binder, adding an appropriate solvent thereto to prepare a negative electrode mix paste, applying the paste to a surface of a current collector, drying the applied paste, and, if needed, pressing the dried paste to increase the electrode density. The conductive agent, the binder, the solvent, and the current collector may be the same as those described in relation with the positive electrode above.

The inorganic magnesium solid electrolyte of the magnesium battery according to the present invention conducts magnesium ions and contains a compound having a complex ion structure that contains magnesium and hydrogen, and may employ any of the structures described above.

The shape of the magnesium battery according to the present invention is not particularly limited and examples of the shape include a coil shape, a button shape, a sheet shape, a stacked shape, a cylindrical shape, a planar shape, and a prism shape. The battery may be applied to a large battery such as those used in electric cars and the like. FIG. 1 is a schematic diagram showing one example of a magnesium battery 10 according to the present invention. The magnesium battery 10 includes a positive electrode 12 in which a positive electrode active material is formed on a current collector 11, a negative electrode 14 in which a negative electrode active material is formed on a current collector 13, an inorganic magnesium solid electrolyte 16 that conducts magnesium ions and is interposed between the positive electrode 12 and the negative electrode 14, and a casing 18 composed of an insulator for housing the positive electrode 12, the negative electrode 14, and the inorganic magnesium solid electrolyte 16.

According to the inorganic magnesium solid electrolyte and the magnesium battery of the present invention described in detail above, a novel material that conducts magnesium ions can be provided since it contains a compound having a complex ion structure that contains magnesium and hydrogen. Moreover, in the present invention, a higher magnesium ion conductivity is exhibited in a relatively low temperature region of 250° C. or lower. Presumably, the inorganic magnesium solid electrolyte can conduct magnesium ions at a higher conductivity at a relatively low temperature because, for example, ion conduction paths are formed by complex anion's specific spatial arrangement.

It should be understood that the present invention is not limited by the embodiments described above and can naturally be implemented in a variety of forms without departing from the technical scope of the present invention.

Figure 2:
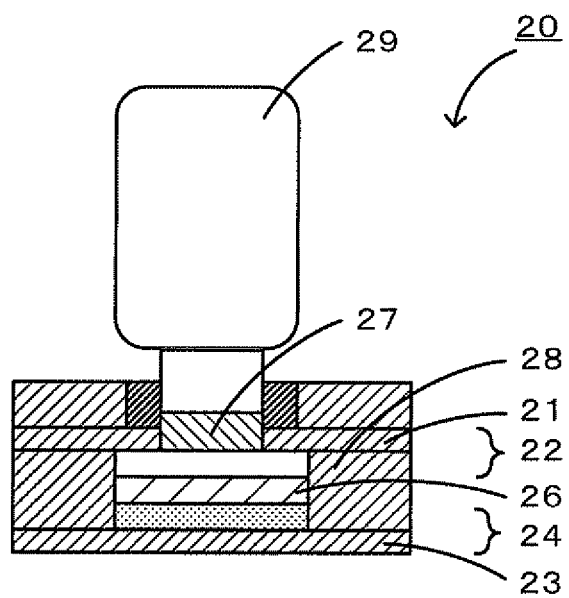
FIG. 2 is a schematic diagram showing an example of a magnesium-air battery 20.

For example, in the embodiments described above, the magnesium battery 10 that uses magnesium as a charge carrier is described but the invention is not limited to this. As shown in FIG. 2, the battery may be a magnesium-air battery. FIG. 2 is a schematic diagram showing an example of a magnesium-air battery 20 according to the present invention. The magnesium-air battery 20 includes a positive electrode 22 that includes a current collector 21 and uses oxygen as a positive electrode active material, a negative electrode 24 that includes a current collector 23 and a magnesium-containing negative electrode active material, an inorganic magnesium solid electrolyte 26 that is interposed between the positive electrode 22 and the negative electrode 24 and conducts magnesium ions, and a casing 28 composed of an insulator for housing the positive electrode 22, the negative electrode 24, and the inorganic magnesium solid electrolyte 26. A gas reservoir 29 containing oxygen gas is installed above the positive electrode 22 through a porous body 27 and oxygen is supplied to the positive electrode 22 from the gas reservoir 29 via the porous body 27. The positive electrode 22 of the magnesium-air battery 20 can include, for example, a conductive agent and a binder and may further include a redox catalyst that cracks oxygen. An example of the redox catalyst is electrolytic manganese dioxide. In this manner also, a power storage device that uses an inorganic magnesium solid electrolyte that conducts magnesium ions according to the present invention can be obtained.

In the embodiments described above, the method for producing an inorganic magnesium solid electrolyte includes a molding step. However, this step may omitted. Moreover, instead of the molding step, a forming step of forming a compound having a complex ion structure on an electrode may be included. In this forming step, for example, a paste or slurry containing a compound having a complex ion structure and a solvent may be prepared and the paste or slurry may be formed on an electrode and dried. Examples of the solvent are organic solvents. Examples of the organic solvents include alcohols such as ethanol, ketones such as acetone, and chloroform.

In the embodiments described above, the present invention is utilized as magnesium batteries but the invention is not limited to this. For example, the present invention may be used in an electrochemical device, such as an ion concentration sensor, that uses any one of the inorganic magnesium solid electrolytes described above.

In the embodiments described above, the present invention is described as an inorganic magnesium solid electrolyte, a production method therefor, and a magnesium battery but is not limited to these. The present invention may be a method that uses, as an ion conducting medium that conducts magnesium ions, a compound having a complex ion structure containing magnesium and hydrogen. In this method of use, the use conditions described in the above-described embodiments can be appropriately used.

EXAMPLES

In the description below, concrete examples of producing an inorganic magnesium solid electrolyte of the present invention are described as Examples.

Example 1

$Mg(BH_4)_2$ (produced by Aldrich) in powder form was cold-pressed at a pressure of 20 MPa into a solid compact and this solid compact was used as an inorganic magnesium solid electrolyte of Example 1.

Example 2

$Mg(BH_4)_2$ (produced by Aldrich) in powder form and $Mg(BH_2)_2$ (produced by KRI Inc.) in powder form were mixed in a molar ratio of 1:1 and then subjected to a heat-treatment step of performing heating at 180° C. for 2 hours in an inert atmosphere (Ar). The powder after heating was cold-pressed at a pressure of 20 MPa into a solid compact and this solid compact was used as an inorganic magnesium solid electrolyte of Example 2.

X-Ray Diffraction Measurement

Figure 3:
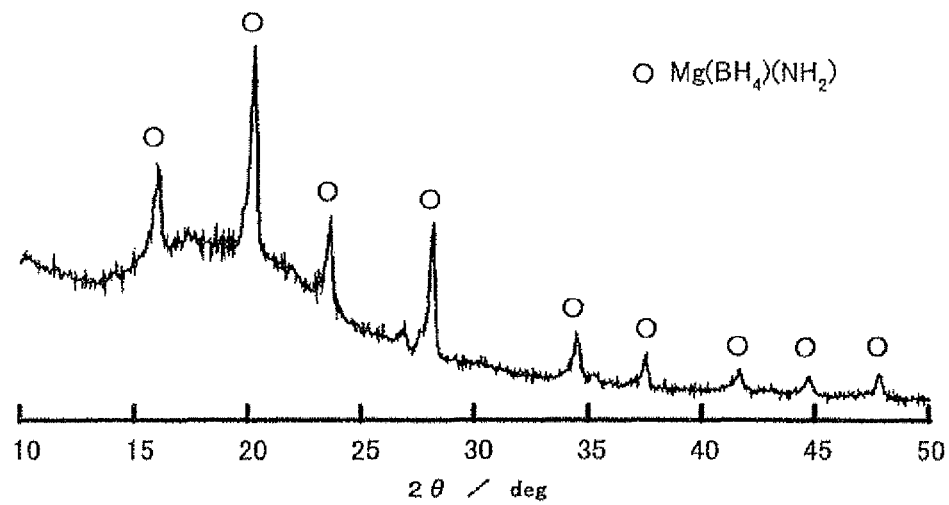
FIG. 3 is a graph showing measurement results of X-ray diffraction from an inorganic magnesium solid electrolyte of Example 2.

The inorganic magnesium solid electrolyte of Example 2 was subjected to X-ray diffraction measurement. The X-ray diffraction measurement was conducted with an X-ray diffractometer (RINT-2200 produced by Rigaku Corporation) with a CuK α emission line in the range of 2θ=10° to 50°. FIG. 3 shows the measurement results of X-ray diffraction from the inorganic magnesium solid electrolyte of Example 2. As shown in FIG. 3, diffraction peaks attributable to $Mg(BH_4)(NH_2)$ were obtained. In other words, it was found that, in Example 2, not a mixture of $Mg(BH_4)_2$ and $Mg(NH_2)_2$ but a compound having a complex ion structure represented by $Mg(BH_4)(NH_2)$ was formed as a result of the heat-treatment step.

Electrical Conductivity Measurement

Molybdenum electrodes were brought into contact with both sides of each of the inorganic magnesium solid electrolytes of Example 1 and Example 2 to prepare evaluation cells.

Figure 4:
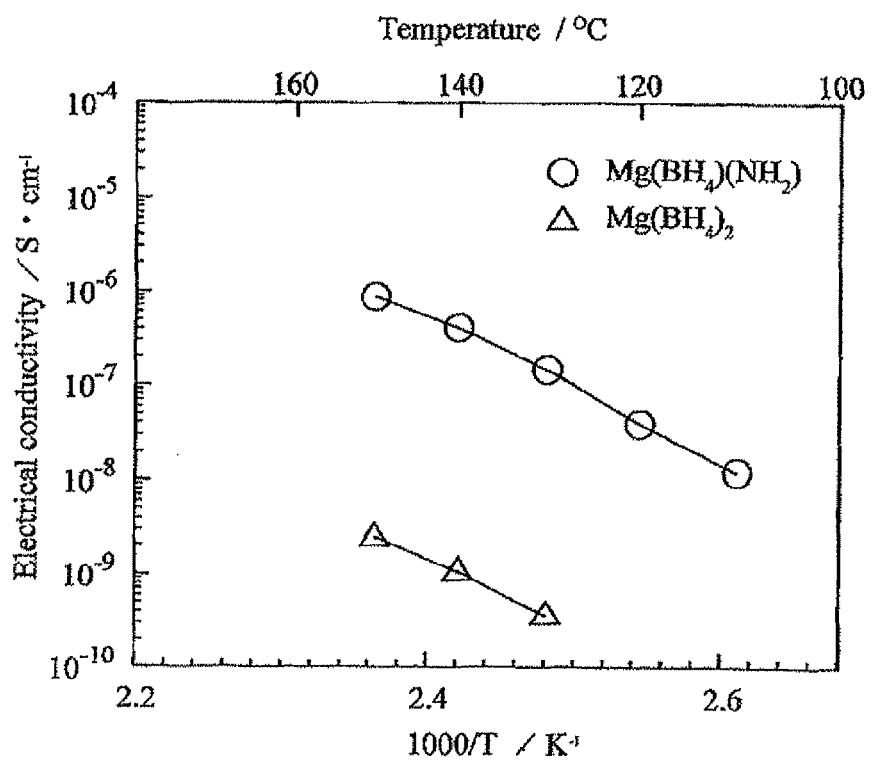
FIG. 4 is a graph showing the relationship between the temperature and electrical conductivity in Examples 1 and 2.

The evaluation cells were subjected to AC impedance measurement with an AC impedance analyzer (Agilent 4294A) in the range of 110° C. to 150° C. at a frequency of 4 Hz to 1 MHz and an amplitude voltage of 10 mV to determine the resistance value from an arc of a Nyquist plot and calculate the electrical conductivity from the resistance value. Table 1 shows the electrical conductivity of Examples 1 and 2. FIG. 4 is a graph showing the relationship between the temperature and the electrical conductivity in Examples 1 and 2. As shown in FIG. 4, a high electrical conductivity of about $3 \times 10^{-9}$ $Scm^{-1}$ was observed at a relatively low temperature of 150° C. from the inorganic magnesium solid electrolyte of Example 1. A high electrical conductivity of about $1 \times 10^{-6}$ $Scm^{-1}$ was observed at a relatively low temperature of 150° C. from the inorganic magnesium solid electrolyte of Example 2.

TABLE 1

| | | ELECTRICAL CONDUCTIVITY/$Scm^{-1}$ | | | | |
|---|---|---|---|---|---|---|
| | COMPLEX ION | 110° C. | 120° C. | 130° C. | 140° C. | 150° C. |
| EXAMPLE 1 | $Mg(BH_4)_2$ | | | $3.6 \times 10^{-10}$ | $1.1 \times 10^{-9}$ | $2.4 \times 10^{-9}$ |
| EXAMPLE 2 | $Mg(BH_4)(NH_2)$ | $1.2 \times 10^{-8}$ | $3.9 \times 10^{-8}$ | $1.5 \times 10^{-7}$ | $4.0 \times 10^{-7}$ | $9.2 \times 10^{-7}$ |

Evaluation of Magnesium Conductivity

The magnesium conductivity was studied by using the inorganic magnesium solid electrolyte of Example 2. First, a cell was prepared by forming electrodes on both ends of the inorganic magnesium solid electrolyte of Example 2. An AC current having a current density of 1.5 µA/cm² was applied to the cell at 150° C. with a lower limit voltage being set to −4.0 V. Electrodes were molybdenum and magnesium metal plates. In a cell having molybdenum electrodes, the lower limit voltage was reached immediately after application of the current and the current did not flow. In contrast, in a cell having magnesium metal plates as the electrodes, the electric current flowed constantly at an overvoltage of about 1 V. Since a constant current could be observed as mentioned above in the case where the magnesium metal was in contact with a compound having a complex ion structure represented by $Mg(BH_4)(NH_2)$, it became clear that magnesium serves as a charge carrier and $Mg(BH_4)(NH_2)$ exhibits magnesium ion conductivity.

Evaluation of Magnesium Battery

A magnesium battery that used the inorganic magnesium solid electrolyte of Example 2 was prepared and the discharge properties thereof were investigated. The positive electrode was prepared as follows. A sulfur powder (produced by Kojundo Chemical Lab. Co., Ltd.) serving as a positive electrode active material and ketjen black (ECP-600 produced by Mitsubishi Chemical Corporation) serving as a conductive agent were weighed to a mass ratio of 7:3, dry-kneaded in a mortar, and cold-pressed at 10 MPa into a compact having a diameter of 10 mm and a thickness of 1 mm. This compact was used as the positive electrode. A magnesium metal plate having a diameter of 10 mm and a thickness of 0.1 mm was used as the negative electrode. The positive electrode and the negative electrode were press-bonded to both sides of the inorganic magnesium solid electrolyte of Example 2 to form a magnesium battery of Example 2. The battery was connected to a charge-discharge device (ACD-003MA-05N) produced by Aska Electronic Co., Ltd., and the open circuit voltage was measured at 150° C. As a result, an open circuit voltage of 1.4 V was obtained. These results show that the magnesium battery that uses the inorganic magnesium solid electrolyte of Example 2 sufficiently functions as a battery.

The present application claims priority from Japanese Patent Application No. 2012-111899 filed on May 15, 2012, the entire contents of description, drawings, and claims of which are incorporated herein by reference.

What is claimed is:

1. An inorganic magnesium solid electrolyte that conducts magnesium ions and contains at least one of $Mg(BH_4)(NH_2)$, $Mg(BH_4)_2$, or $Mg(NH_2)_2$.

2. The inorganic magnesium solid electrolyte according to claim 1, containing at least one of $Mg(BH_4)_2$ or $Mg(NH_2)_2$.

3. The inorganic magnesium solid electrolyte according to claim 1, containing $Mg(BH_4)(NH_2)$.

4. The inorganic magnesium solid electrolyte according to claim 1, wherein $Mg(BH_4)(NH_2)$ is prepared through a heat-treatment step of mixing and heating $Mg(BH_4)_2$ and $Mg(NH_2)_2$.

5. A magnesium battery comprising:
a positive electrode;
a negative electrode that contains a magnesium-containing negative electrode active material; and
the inorganic magnesium solid electrolyte according to claim 1 that is interposed between the positive electrode and the negative electrode and conducts magnesium ions.

6. A method for producing the inorganic magnesium solid electrolyte according to claim 3, the method comprising:
a heat-treatment step of mixing and heating $Mg(BH_4)_2$ and $Mg(NH_2)_2$ to form $Mg(BH_4)(NH_2)$.

\* \* \* \* \*